US012320179B2

(12) United States Patent
Meyer

(10) Patent No.: US 12,320,179 B2
(45) Date of Patent: Jun. 3, 2025

(54) DOOR HINGE FOR A LABORATORY INSTRUMENT DOOR

(71) Applicant: Roche Diagnostics Operations, Inc., Indianapolis, IN (US)

(72) Inventor: Thomas Meyer, Zug (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 978 days.

(21) Appl. No.: 17/444,105

(22) Filed: Jul. 30, 2021

(65) Prior Publication Data

US 2022/0065016 A1 Mar. 3, 2022

(30) Foreign Application Priority Data

Aug. 27, 2020 (EP) .................................... 20193174

(51) Int. Cl.
*E05D 7/08* (2006.01)
*E05D 3/02* (2006.01)
(Continued)

(52) U.S. Cl.
CPC .............. *E05F 1/1223* (2013.01); *E05D 3/02* (2013.01); *E05D 11/06* (2013.01); *E05D 11/04* (2013.01)

(58) Field of Classification Search
CPC .. F25D 23/028; F25D 23/04; F25D 2323/024; F25D 11/00; F25D 25/025; E05Y 2900/31; E05Y 2201/638; E05D 3/02; E05D 5/125; E05D 5/14; E05D 7/081; E05D 7/0027; E05D 11/04; E05D 11/06;
(Continued)

(56) References Cited

U.S. PATENT DOCUMENTS 3,063,089 A * 11/1962 Greenman ................ E05D 5/10 16/303
7,013,531 B2 * 3/2006 Jackson .................. E05F 1/063 16/382

(Continued)

FOREIGN PATENT DOCUMENTS

DE 3805895 C1 7/1989
DE 19728136 C1 4/1999

(Continued)

OTHER PUBLICATIONS

European Search Report issued Feb. 16, 2021, in Application No. 20193174.8, 2 pp.

*Primary Examiner* — Chuck Y Mah
(74) *Attorney, Agent, or Firm* — Thomas E. Lees, LLC

(57) ABSTRACT

A door hinge for a laboratory instrument door, the door hinge comprising a hollow body with a first longitudinal axis and a curved side wall comprising a track. At least a part of the track is inclined relative to the first longitudinal axis. The door hinge further comprises a linear guiding element with a second longitudinal axis parallel to the first longitudinal axis. At least a part of the linear guiding element is arranged in the hollow. The linear guiding element and the hollow body are rotatable against each other. The door hinge further comprises a body comprising a protruding pin. The body is movably attached to the linear guiding element so that the body is movable in two opposite directions along the second longitudinal axis and the protruding pin is movable on the track.

11 Claims, 8 Drawing Sheets

(51) Int. Cl.

| | |
|---|---|
| ***E05D 11/06*** | (2006.01) |
| ***E05F 1/12*** | (2006.01) |
| *E05D 11/04* | (2006.01) |

(58) Field of Classification Search

CPC ......... E05F 1/12; E05F 1/1215; E05F 1/1223; E05F 1/043; E05F 1/1207; E05F 1/063

See application file for complete search history.

(56) References Cited

U.S. PATENT DOCUMENTS

| | | | | |
|---|---|---|---|---|
| 8,701,248 | B2 * | 4/2014 | Dries | E05D 5/10 49/245 |
| 2004/0250377 | A1 | 12/2004 | Park | |
| 2005/0258724 | A1 * | 11/2005 | Hwa Kim | F25D 23/028 312/405 |
| 2006/0123596 | A1 * | 6/2006 | Chen | H04M 1/0216 16/337 |
| 2014/0215760 | A1 * | 8/2014 | Mitchell | E05F 1/1223 16/254 |
| 2016/0237730 | A1 * | 8/2016 | Bacchetti | E05F 1/1223 |
| 2017/0009505 | A1 * | 1/2017 | Adoline | E05F 1/12 |
| 2018/0106087 | A1 * | 4/2018 | Bacchetti | E05F 3/12 |
| 2021/0332628 | A1 * | 10/2021 | Rao | E05F 1/1223 |

FOREIGN PATENT DOCUMENTS

| | | | | | |
|---|---|---|---|---|---|
| DE | 102009023261 | A1 | * | 12/2009 | F16H 37/12 |
| EP | 0415868 | A1 | * | 3/1991 | |
| EP | 1205828 | A1 | | 5/2002 | |
| EP | 3290926 | A1 | | 3/2018 | |
| JP | H1088899 | A | * | 4/1998 | |
| JP | 2000291316 | A | * | 10/2000 | |
| JP | 3274596 | B2 | * | 4/2002 | |
| JP | 2002364233 | A | * | 12/2002 | |
| JP | 6755583 | B2 | * | 9/2020 | |

* cited by examiner

DOOR HINGE FOR A LABORATORY INSTRUMENT DOOR

CROSS-REFERENCE TO RELATED APPLICATIONS

This application claims priority to European Patent Application No. 20193174.8, filed 27 Aug. 2020, the disclosure of which is hereby incorporated by reference in its entirety.

TECHNICAL FIELD

The present disclosure belongs to the field of laboratory instruments. Within this field, it relates to a door hinge for a laboratory instrument door, a laboratory instrument door, a laboratory instrument, a laboratory instrument door assembling kit, and a method for assembling the laboratory instrument door assembling kit.

BACKGROUND

In diagnostic laboratories, automated laboratory instruments such as pre-analytical, analytical, or post-analytical apparatus are used for various sample processing steps to produce accurate and reliable test results which represent pivotal information for physicians.

Typically, the interior of such laboratory instruments is equipped with sample processing devices, consumables, sample vessels, reagent containers, etc. The interior is shielded from the surroundings of the laboratory instrument by a housing in order to protect the interior from environmental factors (e.g., temperature, humidity, dirt, etc.) and/or for preventing unwanted access to the interior of the laboratory instrument. However, for manual or automated loading/unloading of consumables, sample vessels, and reagent containers or for maintenance activities of the sample processing devices access to the interior is required from time to time. Therefore, the housing comprises an entry or gate that can be closed and opened by moving a laboratory instrument door between a closed and opened position.

Usually, a laboratory instrument door comprises one or more door hinges connecting a door leaf or hood with a door frame pivotally so that the door leaf or hood can be moved between the closed and opened position. For facilitating the movement of the door leaf or hood, actuators or spring mechanisms can be used. For example, EP 3 290 926 discloses a laboratory instrument with a housing comprising a frame onto which a hood is pivotally mounted. The housing comprises a gas spring which is mounted onto the hood and the frame for facilitating the pivotal movement of the hood. However, such a construction requires additional space for the gas spring and allows to pivot the door leaf only in restricted angles.

Therefore, there is a need for compact door hinges allowing a high movement flexibility of door leafs or hoods, thereby better serving the needs of laboratory instruments.

SUMMARY

The present disclosure refers to a door hinge for a laboratory instrument door, a laboratory instrument door, a laboratory instrument, a laboratory instrument door assembling kit, and a method for assembling the laboratory instrument door assembling kit.

The present disclosure relates to a door hinge for a laboratory instrument door comprising a hollow body with a first longitudinal axis. The hollow body comprises a curved side wall and the curved side wall comprises a track. At least a part of the track is inclined relative to the first longitudinal axis. The door hinge for the laboratory instrument door further comprises a linear guiding element with a second longitudinal axis parallel to the first longitudinal axis. At least a part of the linear guiding element is arranged in the hollow body. The linear guiding element and the hollow body are rotatable against each other. The door hinge for the laboratory instrument door further comprises a body comprising a protruding pin. The body is movably attached to the linear guiding element so that the body is movable in two opposite directions along the second longitudinal axis and the protruding pin is movable on the track. The door hinge further comprises a force generator configured to exert a force on the body for moving the body in a first direction of the two opposite directions. The force generator is an elastic member connecting the linear guiding element with the body, wherein the force is a tension relaxation of the elastic member.

The present disclosure also relates to a laboratory instrument door comprising a door frame, a door hinge as described herein, and a door leaf. The linear guiding element or the hollow body is mounted on the door frame. The hollow body is mounted on the door leaf if the linear guiding element is mounted on the door frame and the linear guiding element is mounted on the door leaf if the hollow body is mounted on the door frame.

The present disclosure further relates to a laboratory instrument comprising a laboratory instrument door as described herein and a housing. The door frame is mounted on the housing or the door frame is comprised by the housing.

The present disclosure further relates to a laboratory instrument door assembling kit comprising a door frame, a door hinge as described herein, and a door leaf. The door leaf or the door frame comprises a mounting element configured to mount the hollow body. The door frame comprises a mounting structure if the door leaf comprises the mounting element or the door leaf comprises the mounting structure if the door frame comprises the mounting element. The mounting structure is configured to mount the linear guiding element. The mounting structure comprises a fixing plate comprising a first side, a second side, an elongated slot, and a fixation position. The elongated slot is configured to insert the linear guiding element to the fixation position. The hollow body is slidable on the first side of the fixing plate when the linear guiding element is inserted into the elongated slot. The mounting structure further comprises an introduction slope configured to exert a further force on the linear guiding element when the linear guiding element is inserted into the elongated slot. The linear guiding element is movable in the third direction when the introduction slope exerts the further force on the linear guiding element. The elastic member can build up a tension when the linear guiding element moves in the third direction. The mounting structure further comprises a fixing recess configured to fix the linear guiding element. The elastic member can relax its tension when the linear guiding element is in the fixation position. The linear guiding element is movable in the fourth direction when the elastic member relaxes its tension. The linear guiding element is movable into the fixing recess when the linear guiding element moves in the fourth direction. The supporting element of the linear guiding element can press against the second side of the fixing plate when the linear guiding element moves in the fourth direction.

The present disclosure further relates to a method for assembling the laboratory instrument door assembling kit as described herein. The method comprises the following steps:

a) mounting the hollow body on the mounting element; and b) inserting the linear guiding element into the elongated slot of the mounting structure until the linear guiding element is in the fixation position.

These and other features and advantages of the embodiments of the present disclosure will be more fully understood for the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1C:
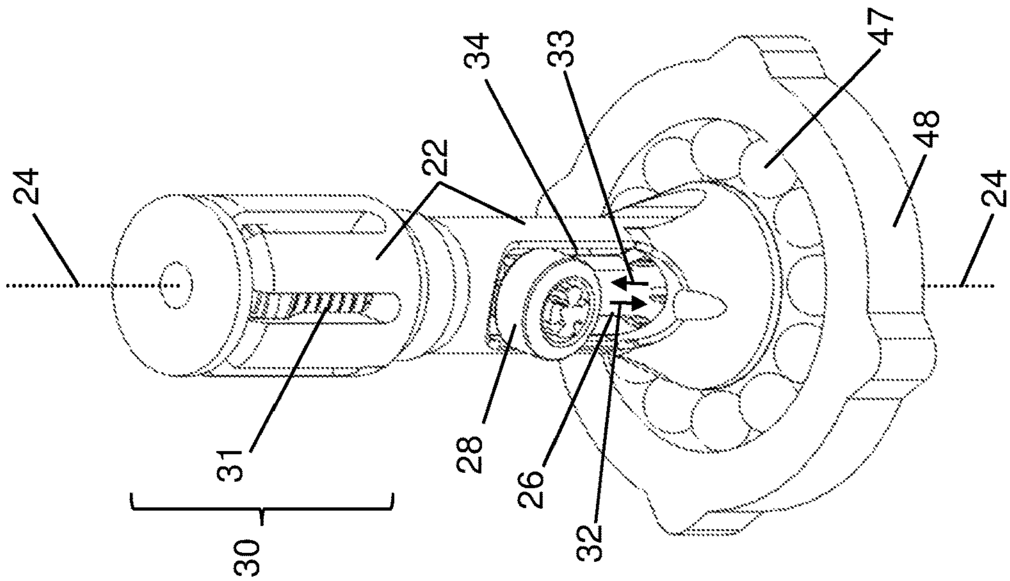
FIGS. 1A-1C show an embodiment of a door hinge for a laboratory instrument door.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

The present disclosure relates to a door hinge for a laboratory instrument door comprising a hollow body with a first longitudinal axis. The hollow body comprises a curved side wall and the curved side wall comprises a track. At least a part of the track is inclined relative to the first longitudinal axis. The door hinge for the laboratory instrument door further comprises a linear guiding element with a second longitudinal axis parallel to the first longitudinal axis. At least a part of the linear guiding element is arranged in the hollow body. The linear guiding element and the hollow body are rotatable against each other. The door hinge for the laboratory instrument door further comprises a body comprising a protruding pin. The body is movably attached to the linear guiding element so that the body is movable in two opposite directions along the second longitudinal axis and the protruding pin is movable on the track. Thus, the movement of the body comprising the protruding pin is guided by the linear guiding element and the track of the hollow body. Accordingly, a linear movement of the body is converted to a rotation between the linear guiding element and the hollow body. The door hinge further comprises a force generator configured to exert a force on the body for moving the body in a first direction of the two opposite directions. The force generator is an elastic member connecting the linear guiding element with the body, wherein the force is a tension relaxation of the elastic member.

As used herein, the term "laboratory instrument door" relates to an assembly comprising a door frame, a door hinge, and a door leaf as further described below.

As used herein, the term "door hinge" relates to a device that allows a door leaf to pivot or rotate on a rotation axis as it opens and closes. If the hollow body is mounted on the door leaf, the rotation axis of the door leaf is determined by the first longitudinal axis. If the linear guiding element is mounted on the door leaf, the rotation axis of the door leaf is determined by the second longitudinal axis. In one embodiment, the first longitudinal axis and the second longitudinal axis are concentric or coaxial. Accordingly, the rotation axis of the door leaf is determined by the first and second longitudinal axis. In one embodiment, the first and second longitudinal axis are vertical. Thus, the door leaf can be opened and closed by a horizontal rotation of the door leaf, e.g., for opening and closing a conventional door leaf. In an alternative embodiment, the first and second longitudinal axis are horizontal. Thus, the door leaf can be opened and closed by a vertical rotation of the door leaf, e.g., for opening and closing an instrument hood.

As used herein, the term "door leaf" relates to a barrier by which an entry or gate to an interior of a laboratory instrument is closed and opened. Thus, a door leaf can be rotated from a closed position, in which the interior of a laboratory instrument is prevented from access, to an open position, in which the interior of the laboratory instrument is exposed so as to allow access, and vice versa. The door leaf may be a conventional door leaf adapted for a laboratory instrument or a laboratory instrument hood.

In one embodiment, the hollow body has a horizontal cross section and the first longitudinal axis is perpendicular to and in the midpoint of its horizontal cross section. In one embodiment, the hollow body is a pipe. Thus, the hollow body comprises one circular side wall und the whole side wall is curved. In another embodiment, the hollow body comprises multiple side walls forming a profile. And at least one of the multiple side walls is a curved side wall. The term "profile" as used herein refers to an elongated constructional member. For example, the hollow body comprises four side walls forming a cube-like profile, wherein at least one of the four side walls is a curved side wall. The hollow body comprises two opposing ends, e.g., a top end and a bottom end or a left end and a right end. In one embodiment, one or both of the two opposing ends are opened ends. For example, the hollow body comprises an opened top end and/or an opened bottom end. In one embodiment, the hollow body is a cube or cuboid with a cylindrical borehole, which is parallel to the first longitudinal axis and is forming a curved sidewall.

As used herein, the term "track" relates to a guiding structure comprised by the curved side wall for guiding the movement of the protruding pin of the body. The track extends over a defined angle arc of the curved side wall. The defined angle arc of the curved side wall may define the maximum rotation angle between the hollow body and the linear guiding element. If the hollow body is a pipe and comprises a circular cross section, the track extends over a defined circular arc and the circular arc may define the maximum rotation angle between the hollow body and the linear guiding. For example, if the angle arc or the circular arc is 45°, the hollow body and the linear guiding element are rotatable 45° against each other. As at least a part of the linear guiding element is arranged within the hollow body, the space requirement for the hinge is independent of the maximum rotation angle between the hollow body and the linear guiding element. Accordingly, the door hinge for the laboratory instrument can be built very compact.

In one embodiment, the track comprises an elongated through hole in the curved side wall. In another embodiment, the curved side wall comprises an internal surface and the track is an elongated depression or groove in the internal surface. Such a depression or groove allows a 360° rotation of the linear guiding element and the hollow body against each other.

As used herein, the term "inclined" means that at least a part of the track is not oriented parallel and is not oriented in a right angle relative to the first longitudinal axis. In one embodiment, a surface normal of the track and a vector parallel to the first longitudinal axis enclose an inclination angle $\alpha$ which is not 0° or 90°. In one embodiment, the inclination angle $\alpha$ is between 45° to 80°, typically between 45° to 70°, or typically between 45° to 60°, or typically between 45° to 50°. In another embodiment, the inclination angle $\alpha$ is 45°. The degree of the inclination or the inclination angle $\alpha$ of the track determines how much force is required for opening or closing a mounted door leaf and/or how fast a mounted door leaf can be opened or closed.

As used herein, the term "linear guiding element" relates to a device adapted to guide the body of the door hinge in two opposite directions along the second longitudinal axis. In one embodiment, the linear guiding element has a horizontal cross section and the second longitudinal axis is perpendicular to and in the midpoint of its horizontal cross section. In one embodiment, the linear guiding element comprises a side wall. In one embodiment, the linear guiding element is a further pipe. Thus, the linear guiding element comprises one further circular side wall. In another embodiment, the linear guiding element is a rectangular plate comprising a side wall. In another embodiment, the linear guiding element comprises multiple side walls forming a profile. For example, the linear guiding element comprises four side walls forming a profile of a cubic-like shape. In a more specific embodiment, one or more but not all of the multiple side walls are opened side walls. The linear guiding element comprises two opposing ends, e.g., a top end and a bottom end or a left end and a right end. In one embodiment, one or both of the two opposing ends are closed ends. For example, the linear guiding element comprises a closed top end and/or closed bottom end.

In one embodiment, the protruding pin is a lateral protrusion of the body. The linear guiding element comprises a linear through hole. The linear trough hole is parallel to the second longitudinal axis and adapted to guide the protruding pin. In one embodiment, the linear through hole is configured to guide the protruding pin in the two opposing directions along the second longitudinal axis. Thus, the movement of the body comprising the protruding pin is guided by the linear though hole and by the track at the same time causing a rotation of the hollow body and linear guiding element against each other. In one embodiment, the side wall of the linear guiding element comprises the linear through hole. For example, if the linear guiding element is a further pipe the side wall of the further pipe comprises the linear through hole.

In one embodiment, the linear guiding element comprises a supporting element adapted to mount the linear guiding element on a door frame or on a door leaf. In a more specific embodiment, the supporting element comprises a plate perpendicular to the second longitudinal axis. In one embodiment, the supporting element comprises bearings. Bearings may improve the rotation of the hollow body and linear guiding element against each other.

In one embodiment, the hollow body comprises a further supporting element adapted to mount the hollow body on the linear guiding element movably. In a more specific embodiment, the further supporting element comprises a plate surrounding the hollow body and is perpendicular to the first longitudinal axis.

In one embodiment, the length of the linear guiding element is longer than the length of the hollow body. Accordingly, the linear guiding element protrudes the hollow body. For example, if the hollow body is a pipe and the linear guiding element is a further pipe, the length of the pipe is shorter than the length the further pipe. Accordingly, the further pipe protrudes the pipe.

In one embodiment, the body is movably and non-rotatable attached to the linear guiding element. In one embodiment, the body comprises two ends. In one embodiment, the body is a piston and the protruding pin is a lateral protrusion of the piston. The piston is movably attached to the linear guiding element. In a more specific embodiment, the piston has a cylindrical form. For example, if the linear guiding element is a further pipe, the piston is cylindrical and movably mounted within the further pipe.

In one embodiment, the body comprises a further protruding pin. The linear guiding element comprises a further linear through hole. The further linear trough hole is parallel to the second longitudinal axis and adapted to guide the further protruding pin. In one embodiment, the further linear through hole is adapted to guide the further protruding pin in the two opposing directions along the second longitudinal axis. In one embodiment, the protruding pin and the further protruding pin are positioned opposite each other. The linear trough hole and the further linear trough hole are positioned opposite each other. For example, if the linear guiding element is a further pipe, the side wall of the further pipe also comprises the further linear through hole. Or, if the linear guiding element comprises multiple side walls forming a of a cubic-like profile, the side wall comprising the linear thorough hole and the side wall comprising the further linear through hole are located opposite each other.

In one embodiment, the hollow body, the linear guiding element, and/or the body comprising the protruding pin is a 3D printing product. The term "3D printing product" as used herein relates to a solid product made through the process of 3D printing. 3D printers can produce a virtually free-formable hollow body, the linear guiding element, and/or body comprising the protruding pin from a filament consisting of thermoplastic polymers, duroplastic polymers, metals, alloys, sintered metals, or sintered alloys.

In one embodiment, the door hinge further comprises a force generator configured to exert a force on the body for moving the body in a first direction of the two opposite directions. In a specific embodiment, the force generator is provided by the body and the force is determined by the weight of the body. In another specific embodiment, the force generator is a weight piece attached to the body and the force is determined by the weight of the weight piece. In another specific embodiment, the force generator is an elastic member connecting the linear guiding element with the body. The force is a tension relaxation of the elastic member. In a more specific embodiment, the elastic member is a spring. In a more specific embodiment, the spring is a linear spring. The linear spring is connecting one end of the body with one closed end of the linear guiding element. For example, the linear spring is connecting the top end of the body and the closed top end of the linear guiding element. Thus, the linear spring is located in between the body and the closed top end of the linear guiding element. The force generator may facilitate or automate the rotation between the linear guiding element and the hollow body against each other.

In another embodiment, the tension relaxation pushes the body in the first direction of the two opposite directions. In yet another embodiment, the tension relaxation pulls the body in the first direction of the two opposite directions.

In one embodiment, the tension of the elastic member is build up when the body is moved in a second direction opposite of the first direction as further described below.

In one embodiment, the track comprises a first section, a moving section, and a second section. The moving section is connecting the first section with the second section. The moving section is inclined relative to the first longitudinal axis. In one embodiment, a surface normal of the moving section and a vector parallel to the first longitudinal axis enclose an inclination angle $\alpha$ which is not 0° or 90°. In one embodiment, the inclination angle $\alpha$ is between 45° to 80°, typically between 45° to 70°, or typically between 45° to 60°, or typically between 45° to 50°. In another embodiment, the inclination angle is 45°.

In one embodiment, the protruding pin is movable between the first section and the second section when the body moves in the two opposite directions. The hollow body is rotatable around the first longitudinal axis in two opposite rotation directions when the protruding pin moves between the first section and the second section or the linear guiding element and the body are rotatable around the second longitudinal axis in two opposite rotation directions when the protruding pin moves between the first section and the second section.

In one embodiment, the body is movable along the second longitudinal axis in the first direction of the two opposite directions, e.g., the force generator exerts a force on the body for moving the body in the first direction as described above. The protruding pin is movable from the first section towards the second section when the body moves in the first direction. The hollow body is rotatable around the first longitudinal axis in a first rotation direction of the two opposite rotation directions when the protruding pin moves from the first section towards the second section or the linear guiding element and the body are rotatable around the second longitudinal axis in a first rotation direction of the two opposite rotation directions when the protruding pin moves from the first section towards the second section. The first rotation direction of the hollow body is opposite of the first rotation direction of the linear guiding element and the body.

In one embodiment, the hollow body is rotatable around the first longitudinal axis in a second rotation direction of the two opposite rotation directions or the linear guiding element and the body are rotatable around the second longitudinal axis in a second rotation direction of the two opposite rotation directions. The protruding pin is movable from the second section towards to first section when the hollow body rotates around the first longitudinal axis in the second rotation direction of the two opposite rotation directions or when the linear guiding element and the body rotate around the second longitudinal axis in a second rotation direction of the two opposite rotation directions. The body is movable along the second longitudinal axis in a second direction of the two opposite directions when the protruding pin moves from the second section towards to first section. The second rotation direction of the hollow body is opposite of the second rotation direction of the linear guiding element and the body.

In one embodiment, the hollow body is rotatable around the first longitudinal axis in the first rotation direction and is thereby opening or closing a door leaf of a laboratory instrument door if the hollow body is mounted on the door leaf and the linear guiding element is mounted on a door frame of a laboratory instrument door. In an alternative embodiment, the linear guiding element and the body are rotatable around the second longitudinal axis in the first rotation direction and are thereby opening or closing a door leaf of a laboratory instrument door if the linear guiding element is mounted on the door leaf and the hollow body is mounted on a door frame of the laboratory instrument door.

In one embodiment, the tension of the elastic member is build up when the body is moved in the second direction of the two opposing directions. The body is movable in the second direction by moving the protruding pin from the second section towards the first section. The protruding pin is movable from the second section towards the first section by rotating the hollow body around the first longitudinal axis in the second rotation direction or by rotating the linear guiding element with the body around the second longitudinal axis in the second rotation direction.

In one embodiment, the hollow body is rotatable in the second rotation direction by moving a door leaf on which the hollow body is mounted from an opened position to a closed position or from a closed position to an opened position. In an alternative embodiment, the linear guiding element with the body is rotatable in the second rotation direction by moving a door leaf on which the linear guiding element is mounted from an opened position to a closed position or from a closed position to an opened position. In one embodiment, the door leaf is movable or pivotable manually or automated. For example, an operator can open or close the door by moving or pivoting the door leaf from a closed position to an opened position or from an opened position to a closed position. In another embodiment, an actuated object presses or pushes the door leaf for moving or pivoting the door leaf from an opened position to a closed position or from a closed position to an opened position. In another embodiment, an actuator is moving or pivoting the door leaf from an opened position to a closed position or from a closed position to an opened position.

In one embodiment, the rotation speed of the hollow body in the first rotation direction or the rotation speed of the linear guiding element and body in the first rotation direction is determined by the force generated by the force generator and by the degree of inclination of the part of the track which is inclined relative to the first longitudinal axis or by the inclination angle $\alpha$. Thus, different rotation speeds can be realized by adapting the degree of inclination/inclination angle $\alpha$ assuming a constant force or by adapting the force assuming a constant degree of inclination/inclination angle $\alpha$. For example, springs with different spring strengths may be used for increasing or decreasing the rotation speed.

In one embodiment, the second section is oriented in a right angle relative to the first longitudinal axis so that the protruding pin is stopped and held on the second section. In one embodiment, a surface normal of the second section and a vector parallel to the first longitudinal axis are parallel to each other so that the protruding pin is stopped and held on the second section. Accordingly, the body is stopped in its linear movement in the first direction at a relative position to the hollow body and the rotation between the hollow body and the linear guiding element with the body against each other is stopped. For example, the protruding pin is stopped and held on the second section when the body moves in the first direction and the hollow body or the linear guiding element with the body rotate around the first longitudinal axis in the first rotation direction.

In one embodiment, the first section is oriented in a right angle relative to the first longitudinal axis so that the protruding pin is stopped and held on the first section. In one embodiment, a surface normal of the first section and a vector parallel to the first longitudinal axis are parallel to each other so that the protruding pin is stopped and held on the first section. Accordingly, the body is stopped in its linear movement in the second direction at a relative position to the hollow body and the rotation between the hollow body and the linear guiding element with the body is stopped. For example, the protruding pin is stopped and held on the first section when the body moves in the second direction and the hollow body or the linear guiding element with the body rotate around the first longitudinal axis in the second rotation direction.

In one embodiment, the protruding pin held by the first section is movable from the first section to the moving section by an initial rotation of the hollow body in the first rotation direction. The initial rotation of the hollow body in the first rotation direction comprises moving or pivoting a door leaf on which the hollow body is mounted. In an alternative embodiment, the protruding pin held by the first section is movable from the first section to the moving section by an initial rotation of the linear guiding element with the body in the first rotation direction. The initial rotation of the linear guiding element with the body in the first rotation direction comprises moving or pivoting a door leaf on which the linear guiding element is mounted. In one embodiment, the door leaf is movable or pivotable manually or automated. For example, an operator can move or pivot the door leaf. In another embodiment, an actuated object presses or pushes the door leaf for moving or pivoting the door leaf. In another embodiment, an actuator is moving or pivoting the door leaf.

In one embodiment, the track comprises a third section. The moving section comprises a first part and a second part. The first part of the moving section is connecting the first section with the third section of the track and the second part of the moving section is connecting the third section with the second section of the track. The third section is oriented in a right angle relative to the first longitudinal axis so that the protruding pin is stopped and held on the third section. In one embodiment, a surface normal of the third section and a vector parallel to the first longitudinal axis are parallel to each other so that the protruding pin is stopped and held on the third section. Accordingly, the body is stopped in its linear movement at a relative position to the hollow body and the rotation between the hollow body and the linear guiding element with the body against each other is stopped. For example, the protruding pin is stopped and held at the third section of the track when the protruding pin moves on the first part of the moving section towards the third section. In one embodiment, the protruding pin held by the third section of the track is movable from the third section to the second part of the moving section for further moving towards the second section by a further initial rotation of the hollow body in the first rotation direction. The further initial rotation of the hollow body in the first rotation direction comprises moving or pivoting a door leaf on which the hollow body is mounted. In an alternative embodiment, the protruding pin held by the third section of the track is movable from the third section to the second part of the moving section for further moving towards the second section by a further initial rotation of the linear guiding element with the body in the first rotation direction. The further initial rotation of the linear guiding element with the body in the first rotation direction comprises moving or pivoting a door on which the linear guiding element is mounted. In one embodiment, the door leaf is movable or pivotable manually or automated. For example, an operator can move or pivot the door leaf. In another embodiment, an actuated object presses or pushes the door leaf for moving or pivoting the door leaf. In another embodiment, an actuator is moving or pivoting the door leaf.

In one embodiment, a surface normal of the first part of the moving section and a vector parallel to the first longitudinal axis enclose an inclination angle $\alpha$ which is not 0° or 90° and a surface normal of the second part of the moving section and a vector parallel to the first longitudinal axis enclose an inclination angle $\beta$ which is not 0° or 90°. In one embodiment, the inclination angle $\alpha$ and the inclination $\beta$ are the same or different. In one embodiment, the inclination angle $\alpha$ is between 45° to 80°, typically between 45° to 70°, or typically between 45° to 60°, or typically between 50° to 40° and the inclination angle $\beta$ is between 45° to 80°, typically between 45° to 70°, or typically between 45° to 60°, or typically between 45° to 50°. In one embodiment, the inclination angle $\alpha$ is between 45° to 80°, typically between 45° to 70°, or typically between 45° to 60°, or typically between 45° to 50° and the inclination angle $\beta$ is between −45° to −80°, typically between −45° to −70°, or typically between −45° to −60°, or typically between −45° to −50°. In another embodiment, the inclination angle $\alpha$ and the inclination angle $\beta$ are 45°. In yet another embodiment, the inclination angle $\alpha$ is 45° and the inclination angle $\beta$ is −45°.

In one embodiment, the linear guiding element protrudes beyond the hollow body. The linear guiding element is movably attached to the hollow body and movable along the first longitudinal axis in a third direction and in a fourth direction opposite of the third direction when the protruding pin is held on the first section, second section, or third section of the track. For example, the linear guiding element is movable in the third direction by exerting a further force on the linear guiding element. Thereby a tension is build up on the elastic element. The linear guiding element is movable in the fourth direction by relaxing the build tension. This embodiment may be advantageous for assembling a laboratory instrument door assembling kit without the usage fastening elements like screws or bolts as further described below.

The present disclosure also relates to a laboratory instrument door comprising a door frame, a door hinge as described herein, and a door leaf. The linear guiding element or the hollow body is mounted on the door frame. The hollow body is mounted on the door leaf if the linear guiding element is mounted on the door frame and the linear guiding element is mounted on the door leaf if the hollow body is mounted on the door frame.

In one embodiment, the door leaf or the door frame comprises a mounting element configured to mount the hollow body. The door frame comprises a mounting structure configured to mount the linear guiding element if the door leaf comprises the mounting element or the door leaf comprises the mounting structure if the door frame comprises the mounting element. In one embodiment, the mounting element is a fixation hole into which the hollow body can be inserted and fixed. And the mounting structure is a platform on which the linear guiding element, e.g., via supporting element and screws or bolts, can be mounted.

In one embodiment, the door leaf is movable or pivotable between a closed position and an open position. The door leaf is movable or pivotable to the closed position or opened position when the body moves in the first direction. In one embodiment, the angle between the closed position and the opened position of the door leaf is defined by the two end points of an angle arc or circular angle of the curved side wall over which the track extends. For example, the track extends over an angle arc or circular arc of 45° of the curved side and the angle between the open position and the closed position of the door leaf is 45°.

In one embodiment, the protruding pin is located at the first section when the door leaf is in the opened position and the protruding pin is located at the second section when the door leaf is in the closed position. In another embodiment, the pin is located at the first section when the door leaf is in the closed position and the pin is located at the second section when the door leaf is in the opened position.

In one embodiment, the door frame is configured to stop the door leaf when the body moves in the first direction so that the protruding pin is stopped on the moving section when the door frame stops the door leaf. As the protruding pin is stopped on the inclined moving section, the force on the body for moving the body in the first direction presses the door leaf towards to door frame. Therefore, the door is better kept in the closed position. Depending on the exerted force on the body no additional lock mechanism is required to keep the door in the closed position. In one embodiment, the angle between the closed position and the opened position of the door leaf is smaller than the angle arc or circular angle of the curved side wall over which the track extends. For example, the track extends over an angle arc or circular arc of 50° of the curved side and the angle between the open position and the closed position of the door leaf is only 45°.

The present disclosure further relates to a laboratory instrument comprising a laboratory instrument door as described herein and a housing. The door frame is mounted on the housing or the door frame is comprised by the housing.

As used herein, the term "laboratory instrument" relates to a pre-analytical apparatus, an analytical apparatus, or a post-analytical apparatus of a diagnostic laboratory. A pre-analytical apparatus can usually be used for the preliminary processing of test samples or test sample vessels. An analytical apparatus can be designed, for example, to use a test sample or part of the test sample and a test reagent in order to produce a measurable signal, on the basis of which it is possible to determine whether an analyte is present, and if desired in what concentration. A post-analytical apparatus can usually be used for the post-processing of test samples or test sample vessels like the archiving of test samples or test sample vessels. The pre-analytical, analytical and post-analytical apparatus may comprise, for example, at least one device from the group of following devices: a sorting device for sorting test sample vessels, a cap removal device for removing caps or closures on test sample vessels, a cap fitting device for fitting caps or closures on test sample vessels, a cap removal/fitting device for removing/fitting caps or closures on test sample vessels, a pipetting device for pipetting test samples, an aliquoting device for aliquoting test samples, a centrifuging device for centrifuging test samples, an analyzing device for analyzing test samples, a heating device for heating test samples, a cooling device for cooling test samples, a mixing device for mixing test samples, a separation device for isolating analytes of test samples, a storing device for storing test samples, an archiving device for archiving test samples, a test sample vessel type determination device for determining test sample vessel types, a test sample quality determination device for determining test sample qualities, a test sample vessel identification device for identifying test sample vessels. Such pre-analytical apparatus, analytical apparatus, post-analytical apparatus, and devices are well known in the art.

As used herein, the term "housing" relates to a rigid cover or case for protecting the interior of the laboratory instrument from environmental factors (e.g., temperature, humidity, dirt, etc.) and/or for preventing access to the interior of the laboratory instrument. The housing comprises an entry or gate to the interior of the laboratory instrument. The entry or gate can be closed and opened by moving or pivoting the door leaf of the laboratory instrument door from an opened position to a closed position and from a closed position to an opened position. In one embodiment, the movement or pivoting of the door leaf of the laboratory instrument door from the opened position to the closed position or from the closed position to the opened position is actuated by the force generator of the door hinge as described above.

The present disclosure further relates to a laboratory instrument door assembling kit comprising a door frame, a door hinge as described herein, and a door leaf. The door leaf or the door frame comprises a mounting element configured to mount the hollow body. The door frame comprises a mounting structure if the door leaf comprises the mounting element or the door leaf comprises the mounting structure if the door frame comprises the mounting element. The mounting structure is configured to mount the linear guiding element. The mounting structure comprises a fixing plate comprising a first side, a second side, an elongated slot, and a fixation position. The elongated slot is configured to insert the linear guiding element to the fixation position. The hollow body is slidable on the first side of the fixing plate when the linear guiding element is inserted into the elongated slot. The mounting structure further comprises an introduction slope configured to exert a further force on the linear guiding element when the linear guiding element is inserted into the elongated slot. The linear guiding element is movable in the third direction when the introduction slope exerts the further force on the linear guiding element. The elastic member can build up a tension when the linear guiding element moves in the third direction. The mounting structure further comprises a fixing recess configured to fix the linear guiding element. The elastic member can relax its tension when the linear guiding element is in the fixation position. The linear guiding element is movable in the fourth direction when the elastic member relaxes its tension. The linear guiding element is movable into the fixing recess when the linear guiding element moves in the fourth direction. The supporting element of the linear guiding element can press against the second side of the fixing plate when the linear guiding element moves in the fourth direction.

Such a laboratory instrument door assembling kit allows an assembling of a laboratory instrument door without the usage fastening elements like screws or bolts.

The present disclosure further relates to a method for assembling the laboratory instrument door assembling kit as described herein. The method comprises the following steps:

a) mounting the hollow body on the mounting element; and
b) inserting the linear guiding element into the elongated slot of the mounting structure until the linear guiding element is in the fixation position.

In one embodiment, step a) is executed before step b). In an alternative embodiment, step b) is executed before step a).

In order that the embodiments of the present disclosure may be more readily understood, reference is made to the following examples, which are intended to illustrate the disclosure, but not limit the scope thereof.

Figure 1B:
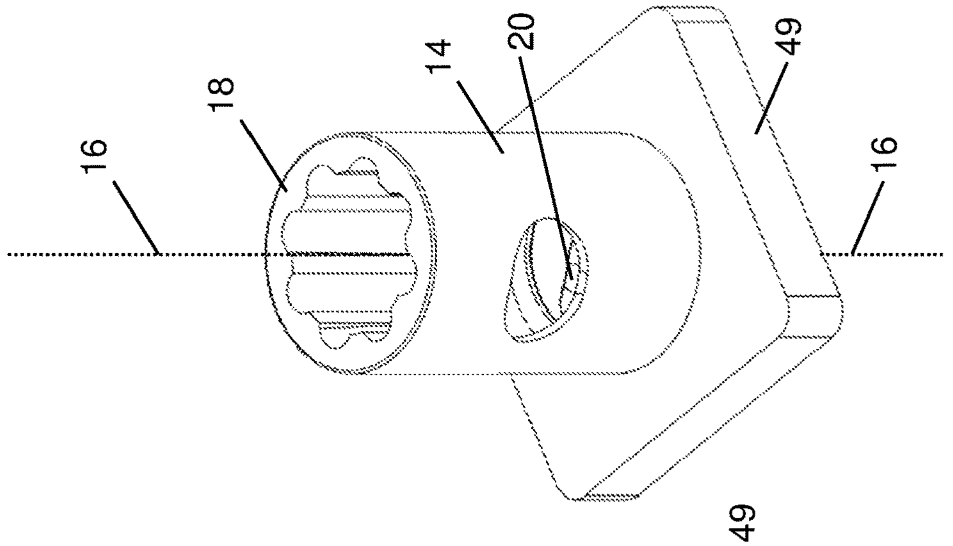
Figure 1A:
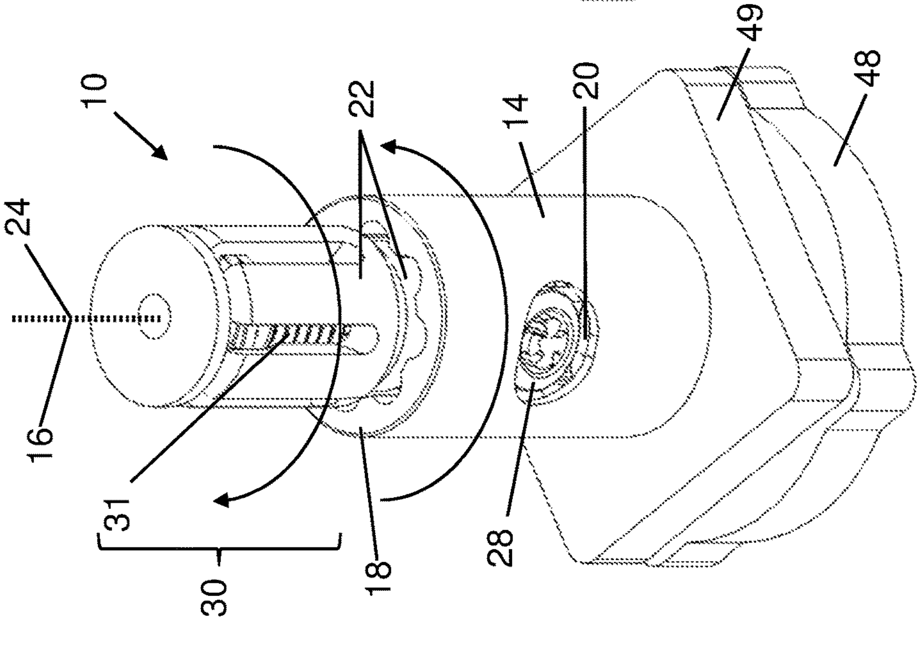

FIGS. 1A-1C show an embodiment of a door hinge (10) for a laboratory instrument door (50). As shown in FIGS. 1A and 1B, the door hinge (10) comprises a hollow body (14) with a first longitudinal axis (16). The hollow body (14) comprises a curved side wall (18). The curved side wall (18) comprises a track (20), which is only partially visible FIGS. 1A and 1B. At least a part of the track (20) is inclined relative to the first longitudinal axis (16) as shown in FIG. 3. As shown in FIG. 1A and FIG. 1C, the door hinge (10) further comprises a linear guiding element (22) with a second longitudinal axis (24) parallel to the first longitudinal axis (16). In the shown embodiment, the first longitudinal axis (16) and the second longitudinal axis (24) are concentric or coaxial. At least a part of the linear guiding element (22) is arranged in the hollow body (14) as shown in FIG. 1A. The linear guiding element (22) and the hollow body (14) are rotatable against each other as indicated by two opposite round arrows. As shown in FIG. 1C and FIG. 2A, the door hinge (10) further comprises a body (26) comprising a protruding pin (28). In FIG. 1A, only the protruding pin (28) is visible. The body (26) is movably attached to the linear guiding element (22) so that the body (26) is movable in two opposite directions (32, 33) along the second longitudinal axis (24) while the protruding pin (28) is movable on the track (20, not shown). In the shown embodiment, the hollow body (14) is a pipe and the linear guiding element (22) is a further pipe. The shown linear guiding element (22) comprises a supporting element (48) adapted to mount the linear guiding element (22) on a door frame (52) or on a door leaf (54) as shown in FIG. 4. The shown hollow body (14) comprises a further supporting element (49) adapted to mount the hollow body (14) on the linear guiding element (22). In FIG. 1B, only the hollow body (14) of the door hinge (10) is shown. The hollow body (14) comprises the first longitudinal axis (16), the curved side wall (18), and the further supporting element (49). The hollow body further comprise a track (20) which is only partially visible in FIG. 1B. In FIG. 1C, only the linear guiding element (22) and the body (26) comprising a protruding pin (28) are shown. The body (26) is movably attached to the linear guiding element (22) so that the body (26) is movable in two opposite directions (32, 33) along the second longitudinal axis (24) as indicated by the opposite linear arrows in FIG. 1C. As further shown in FIG. 1C, the protruding pin (28) is a lateral protrusion of the body (26). The linear guiding element (22) comprises a linear through hole (34). The linear trough hole (34) is parallel to the second longitudinal axis (24) and adapted to guide the protruding pin (28) in the two opposite directions (32, 33). The shown supporting element (48) of the linear guiding element (22) comprises bearings (47) for improving the rotation of the hollow body (14) and linear guiding element (22) against each other. As further shown in FIGS. 1A and 1C, the door hinge (10) comprises a force generator (30) configured to exert a force on the body (26) for moving the body (26) in a first direction (32) of the two opposite directions (32, 33). In the shown embodiment, the force generator (30) is an elastic member (31), specifically a linear spring connecting the closed top end of linear guiding element (22) with the top end of the body (26). Thus, the elastic member (31) is located in between the body (26) and the closed top end of the linear guiding element (22).

Figure 2B:
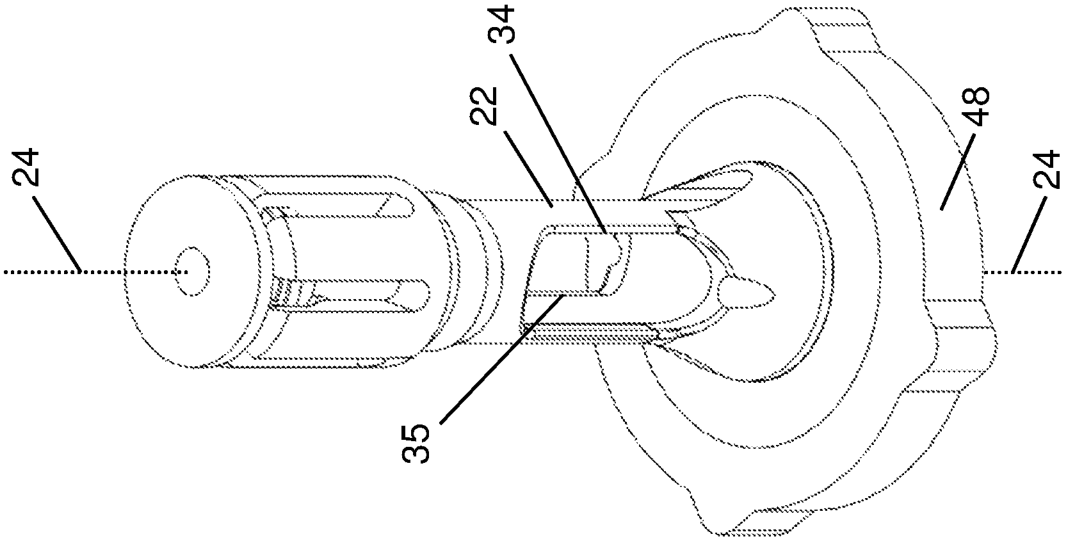
FIGS. 2A-2B show an embodiment of a body comprising a protruding pin and a linear guiding element.
Figure 2A:
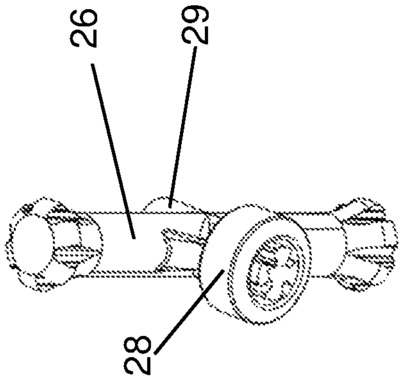

FIGS. 2A-2B show the same body (26) comprising the protruding pin (28) and the linear guiding element (22) as shown in FIGS. 1A and 1C. In FIG. 2A only the body (26) comprising the protruding pin (28) is shown. In the shown embodiment, the body (26) comprises a further protruding pin (29). The protruding pin (28) and the further protruding pin (29) are positioned opposite each other. In FIG. 2B only the linear guiding element (22) with its second longitudinal axis (24), linear through hole (34), and supporting element (48) are shown. In the shown embodiment, the linear guiding element (22) comprises a further linear through hole (35). The further linear trough hole (35) is parallel to the second longitudinal axis (24) and adapted to guide the further protruding pin (29) in the two opposing directions (32, 33) along the second longitudinal axis (24). The shown further linear through hole (35) is positioned opposite of the linear through hole (34). Guiding two protruding pins (28, 29) of the body (26) by two linear through holes (34, 35) improves the guiding of the body (26) in the two opposite directions (32, 33).

Figure 3A:
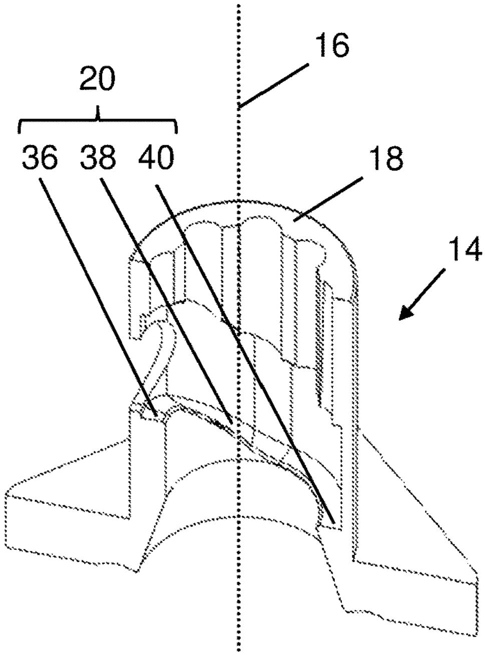
FIGS. 3A-3D depict embodiments of hollow bodies and tracks.
Figure 3B:
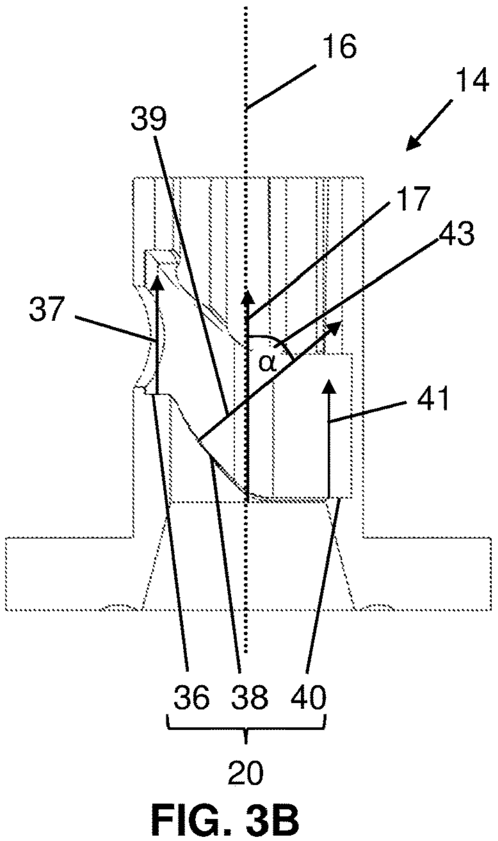
Figure 3C:
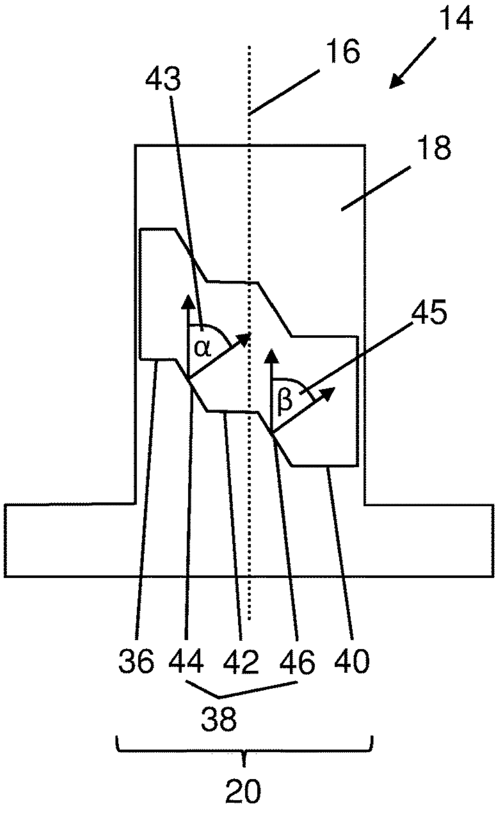
Figure 3D:
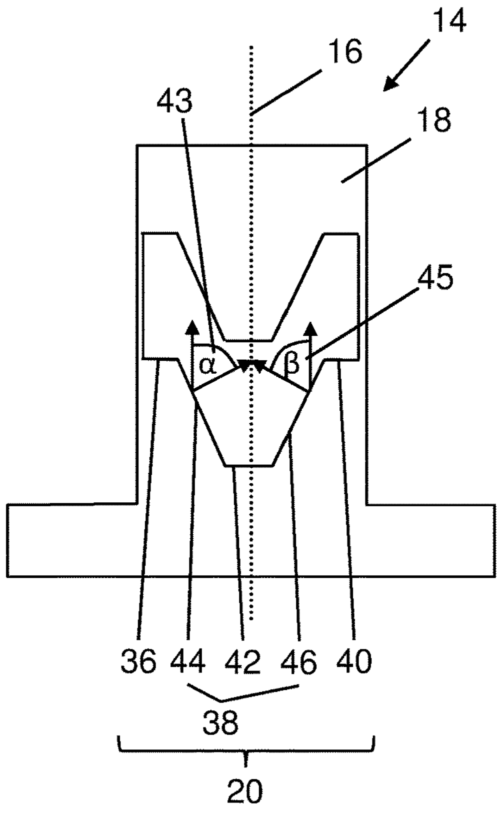

FIGS. 3A-3D depict embodiments of hollow bodies (14) and tracks (20). FIG. 3A shows a perspective view of a cross-section of the hollow body (14) with its first longitudinal axis (16) and curved side wall (18) as shown in FIGS. 1A and 1B. FIG. 3B shows a side view of the cross-section of the hollow body (14) as shown in FIG. 3A. As shown in FIGS. 3A and 3B, the curved side wall (18) comprises a track (20) on which the protruding pin (28) is movable. In the shown embodiment, the track (20) is an elongated depression or groove of the internal surface of the curved side wall (18) and comprises a first section (36), a moving section (38), and a second section (40). The moving section (38) is connecting the first section (36) with the second section (40). The moving section (38) is inclined relative to the first longitudinal axis (16). As shown in FIG. 3B, a surface normal (39) of the moving section (38) and a vector (17) parallel to the first longitudinal axis (16) enclose an inclination angle $\alpha$ (43) which is not 0° or 90°. In the shown embodiment, the inclination angle $\alpha$ is 50°. The protruding pin (28) is movable from the first section (36) towards the second section (40) when the body (26) moves in the first direction (32). Thus, the movement of the protruding pin (28) is guided by the track (20) and by the linear through hole (34) causing a rotation of the hollow body (14) and the linear guiding element (22) against each other. For example, the movement of the protruding pin (28) from the first section (36) to the second section (40) causes the hollow body (14) to rotate around the first longitudinal axis (16) in a first rotation direction or causes the linear guiding element (22) and the body (26) (28) to rotate around the second longitudinal axis (24) in a first rotation direction. As further shown in FIG. 3B, the second section (40) is oriented in a right angle relative to the first longitudinal axis (16) so that the protruding pin (28) is stopped and held on the second section (40) when the body (26) moves in the first direction (32). A surface normal (41) of the second section (40) and a vector (17) parallel to the first longitudinal axis (17) are parallel to each other so that the protruding pin is stopped and held on the second section (40) when the body (26) moves in the first direction (32). The second section (40) may define an open position or closed position of a door leaf (54) of a laboratory instrument door (50). The shown first section (36) is also oriented in a right angle relative to the first longitudinal axis (16) so that the protruding pin (28) is stopped and held on the first section (36) when the body (26) moves in the second direction (33) opposite of the first direction (32). A surface normal (37) of the first section (36) and a vector (17) parallel to the first longitudinal axis (17) are parallel to each other so that the protruding pin is stopped and held on the first section (36) when the body (26) moves in the second direction (33) opposite of the first direction (32). The first section (36) may define a closed or open position of a door leaf (54) of a laboratory instrument door (50). FIG. 3C shows a schematic side view of a cross-section of a further embodiment of the hollow body (14). The shown hollow body (14) comprises a track (20) with a third section (42). The moving section (38) comprises a first part (44) and a second part (46). The first part (44) of the moving section (38) is connecting the first section (36) with the third section (42) of the track (20). The second part (46) of the moving section (38) is connecting the third section (42) with the second section (40) of the track (20). The third section (42) is oriented in a right angle relative to the first longitudinal axis (16) so that the protruding pin (28) is stopped and held on the third section (42) when the body (26) moves in the first direction (32) or second direction (33). A surface normal (not shown) of the third section (42) and a vector (not shown) parallel to the first longitudinal axis (16) are parallel to each other so that the protruding pin (28) is stopped and held on the third section (42) when the body (26) moves in the first direction (32) or second direction (33). Thus, the third section (40) may define an intermediate position between an open position and a closed position of a door leaf (54) of a laboratory instrument door (50). In FIG. 3C, the first part (44) and the second part (46) of the moving section (38) have the same inclination angles relative to the first longitudinal axis (16). A surface normal of the first part (44) of the moving section (38) and a vector parallel to the first longitudinal axis (16) enclose an inclination angle α (43) and a surface normal of the second part (46) of the moving section (38) and a vector parallel to the first longitudinal enclose an inclination angle β (45). The inclination angle α (43) and the inclination β (45) are the same in FIG. 3C. However, the first section (36), the second section (40), and the third section (42) may be arranged so that the first part (44) of the moving section (38) has a positive inclination angle α (43) and the second part (46) of the moving section (38) has a negative inclination angle β (45) as shown in FIG. 3D. This arrangement of the track (20) may be advantageous for moving a door leaf (54) from one closed position to two different open positions or from one open position to two different closed positions.

Figure 4B:
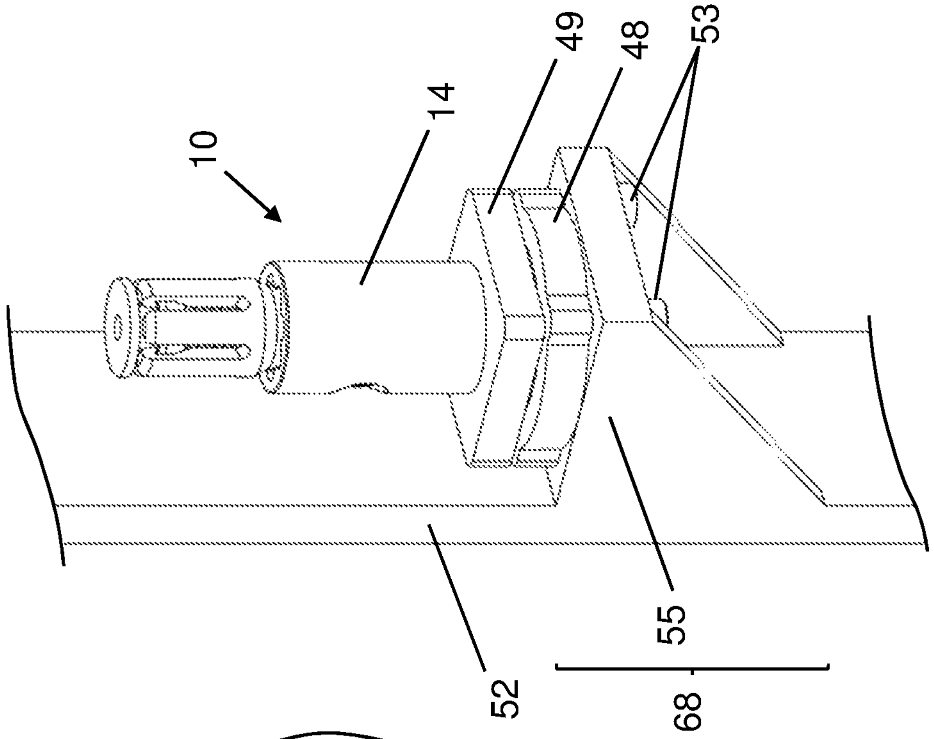
FIGS. 4A-4B show an embodiment of a laboratory instrument door.
Figure 4A:
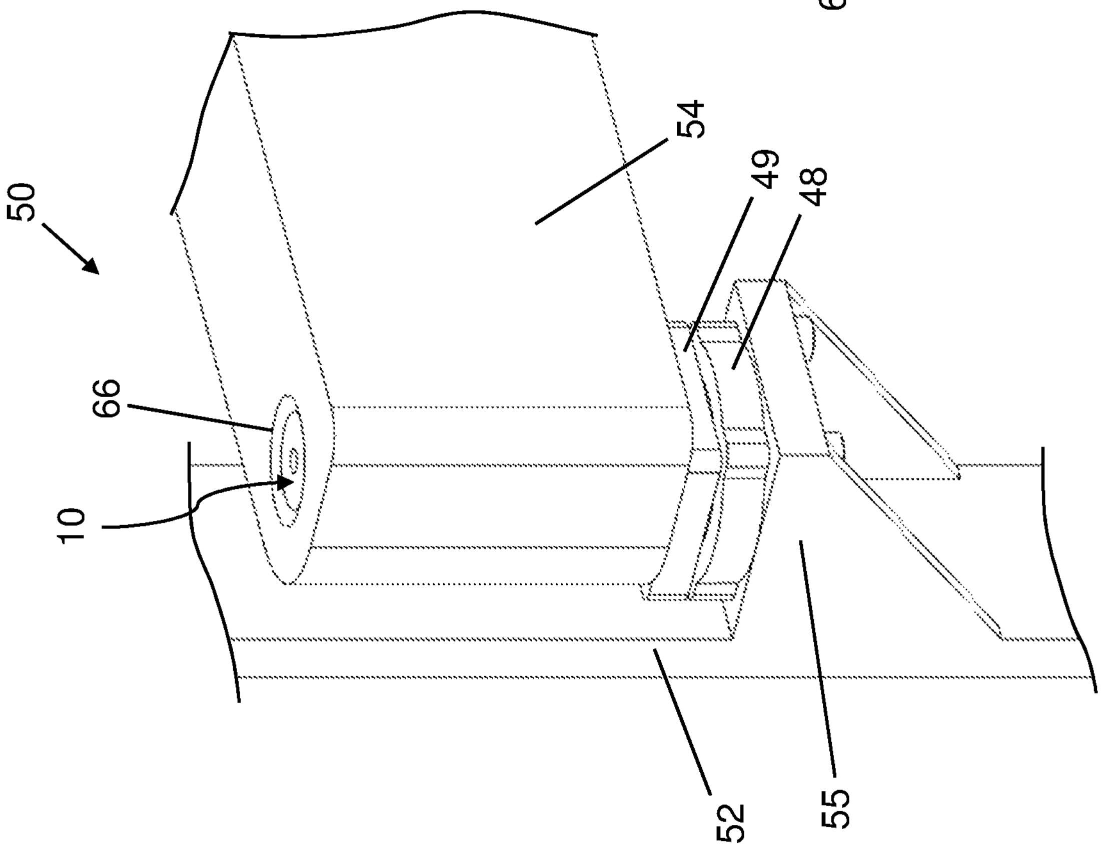

FIGS. 4A-4B show an embodiment of a laboratory instrument door (50). The laboratory door (50) as shown in FIG. 4A comprises a door frame (52), a door hinge (10) as shown in FIG. 1A, and a door leaf (54). In the shown embodiment, the linear guiding element (22) is mounted on the door frame (52) via supporting element (48). The hollow body (14) is mounted on the door leaf (54) and on the linear guiding element (22) via further supporting element (49). The hollow body (14) is mounted on the door leaf (54) via a mounting element (66). The door leaf (54) comprises the mounting element (66) in form of a fixation hole into which the hollow body (14) can be inserted and fixed. FIG. 4B shows the laboratory instrument door (50) without the door leaf (54). In the shown embodiment, the supporting element (48) is mounted on mounting structure (68) in form of a platform (55) of the door frame (52) with screws (53).

Figure 5:
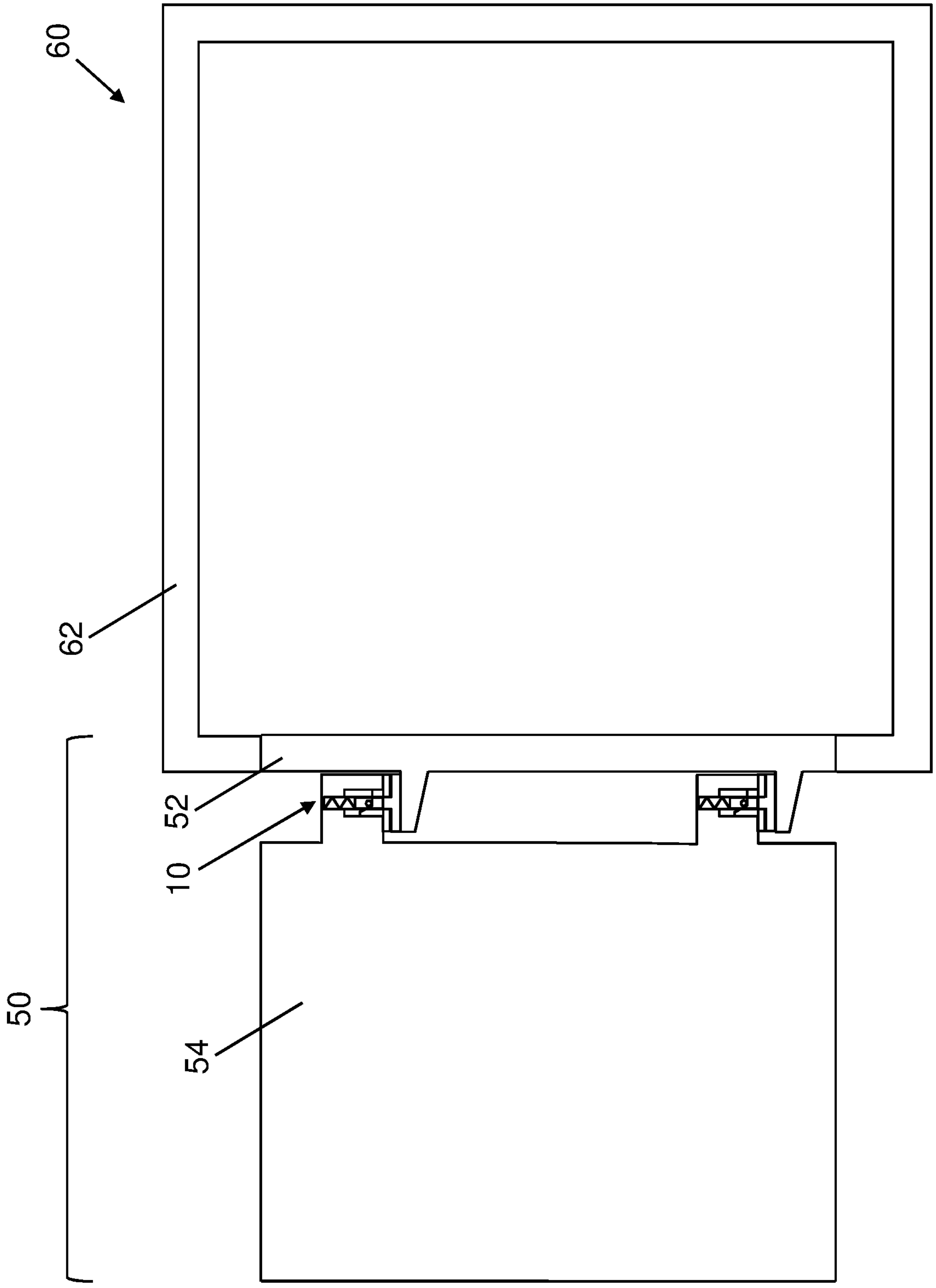
FIG. 5 shows an embodiment of a laboratory instrument.

FIG. 5 shows a schematic side view of an embodiment of a laboratory instrument (60). The laboratory instrument (60) comprises a laboratory instrument door (50) as shown in FIG. 4 and a housing (62). In the shown example, the door frame (52) is mounted on the housing (62) and the door leaf (54) is in an opened position. The door leaf (54) is mounted on the door frame (52) by two door hinges (10). However, the door leaf (52) can be mounted with one door hinge (10) or with more than two door hinges (10). It is also possible to use a combination of door hinges (10) as described herein and ordinary door hinges for mounting the door leaf (54) on the door frame (52).

Figure 6A:
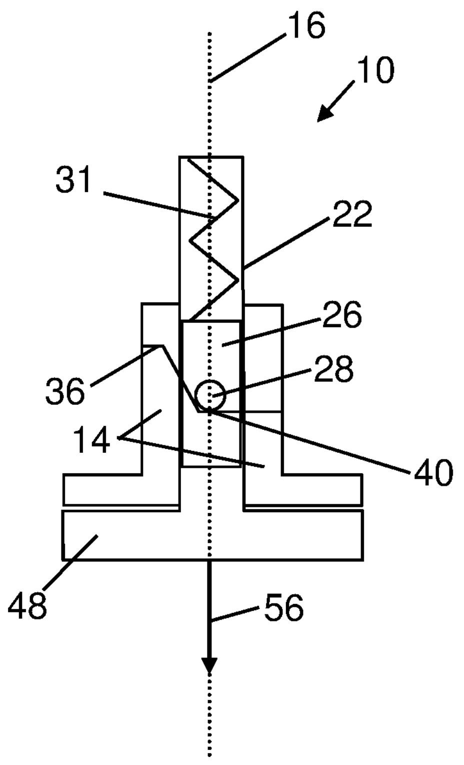
FIGS. 6A-6B show schematic side views of an embodiment of a door hinge for a laboratory instrument door.
Figure 6B:
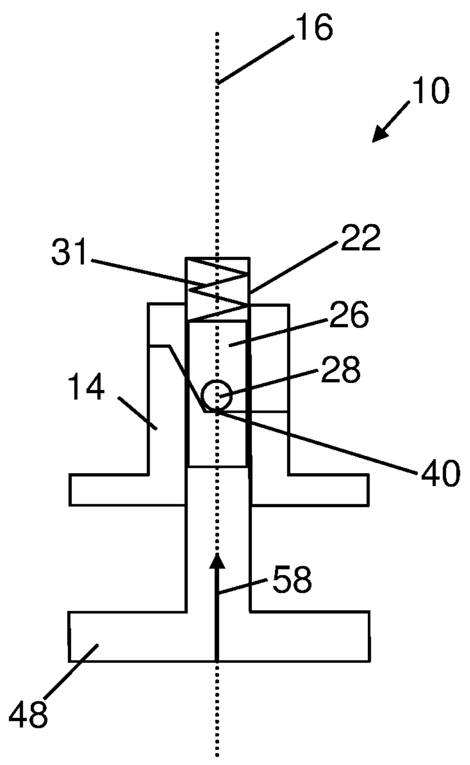

FIGS. 6A-6B show schematic side views of a cross section of the door hinge (10) for a laboratory instrument door (50) as shown in FIG. 1A. As shown in FIG. 6A, the door hinge (10) comprises a linear guiding element (22) which protrudes beyond the hollow body (14). The protruding pin (28) is held on the second section (40) which is in a right angle relative to the first longitudinal axis (16). The linear guiding element (22) is movably attached to the hollow body (14) and movable along the first longitudinal axis (16) in a third direction (56) as indicated by an arrow in FIG. 6A. For example, the linear guiding element (22) may be moved in the third direction (56) by exerting a further force on the top end of the linear guiding element (22). The linear guiding element (22) would also be movable along the first longitudinal axis (16) in the third direction (56) when the protruding pin (28) is held on a first section (36) or on a third section (42, not shown) of the track (20) which are in a right angle relative to the first longitudinal axis (16). By moving the linear guiding element (22) in the third direction (56), a tension of the elastic member (31) which connects the linear guiding element (22) with the body (26) comprising the protruding pin (28) is build up as shown in FIG. 6B. FIG. 6B further shows that the linear guiding element (22) is movable along the first longitudinal axis (16) in a fourth direction (58) opposite of the third direction (56) as indicated by an arrow. The linear guiding element (22) is moved in the fourth direction (58) by a tension relaxation of the clastic member (31).

Figure 7B:
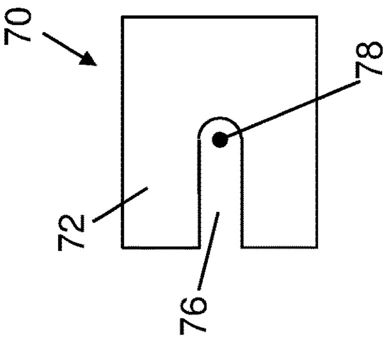
FIGS. 7A-7B show schematic views of an embodiment of a laboratory instrument door assembling kit.
Figure 7A:
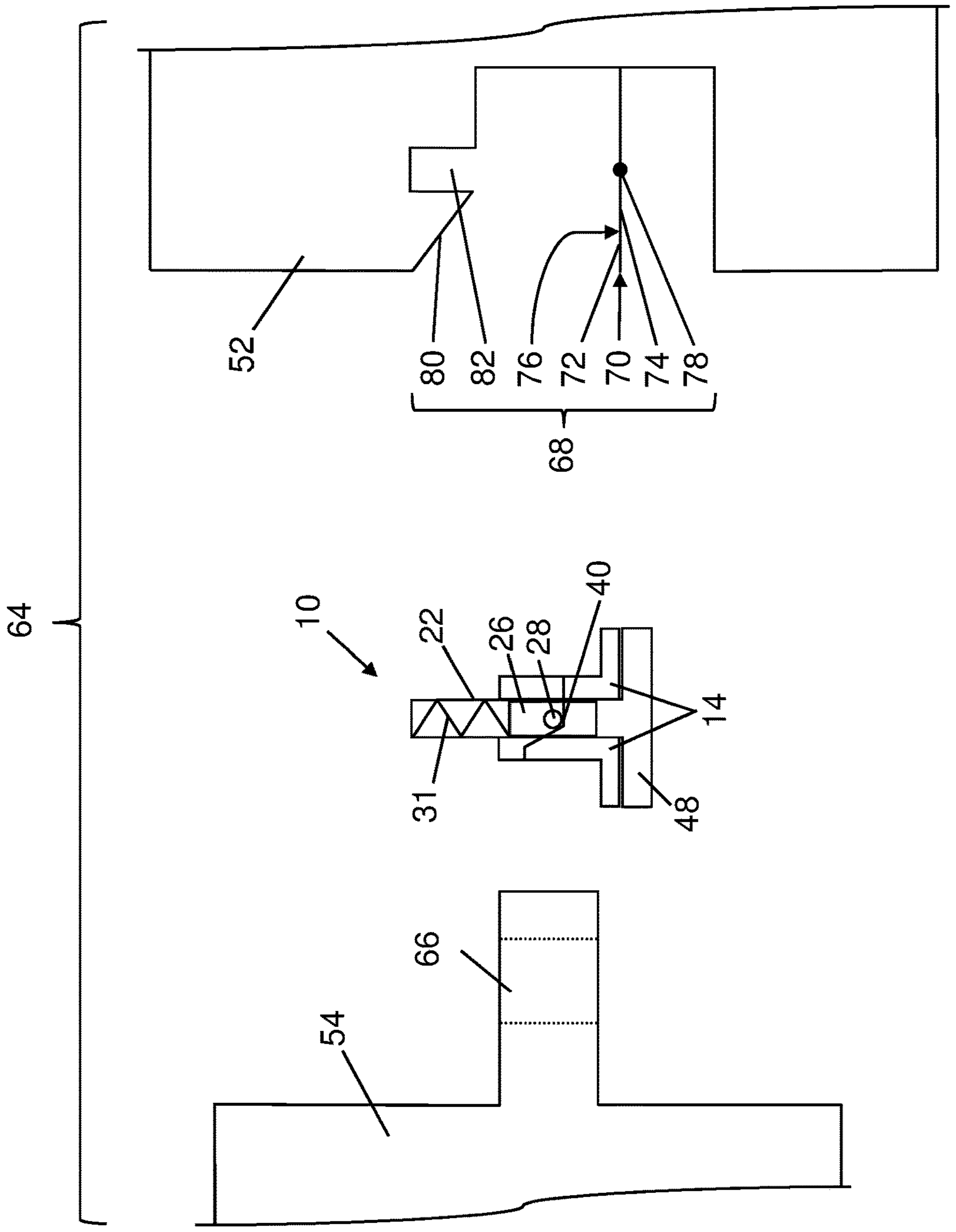
Figures 8A, 8B, 8C, 8D:
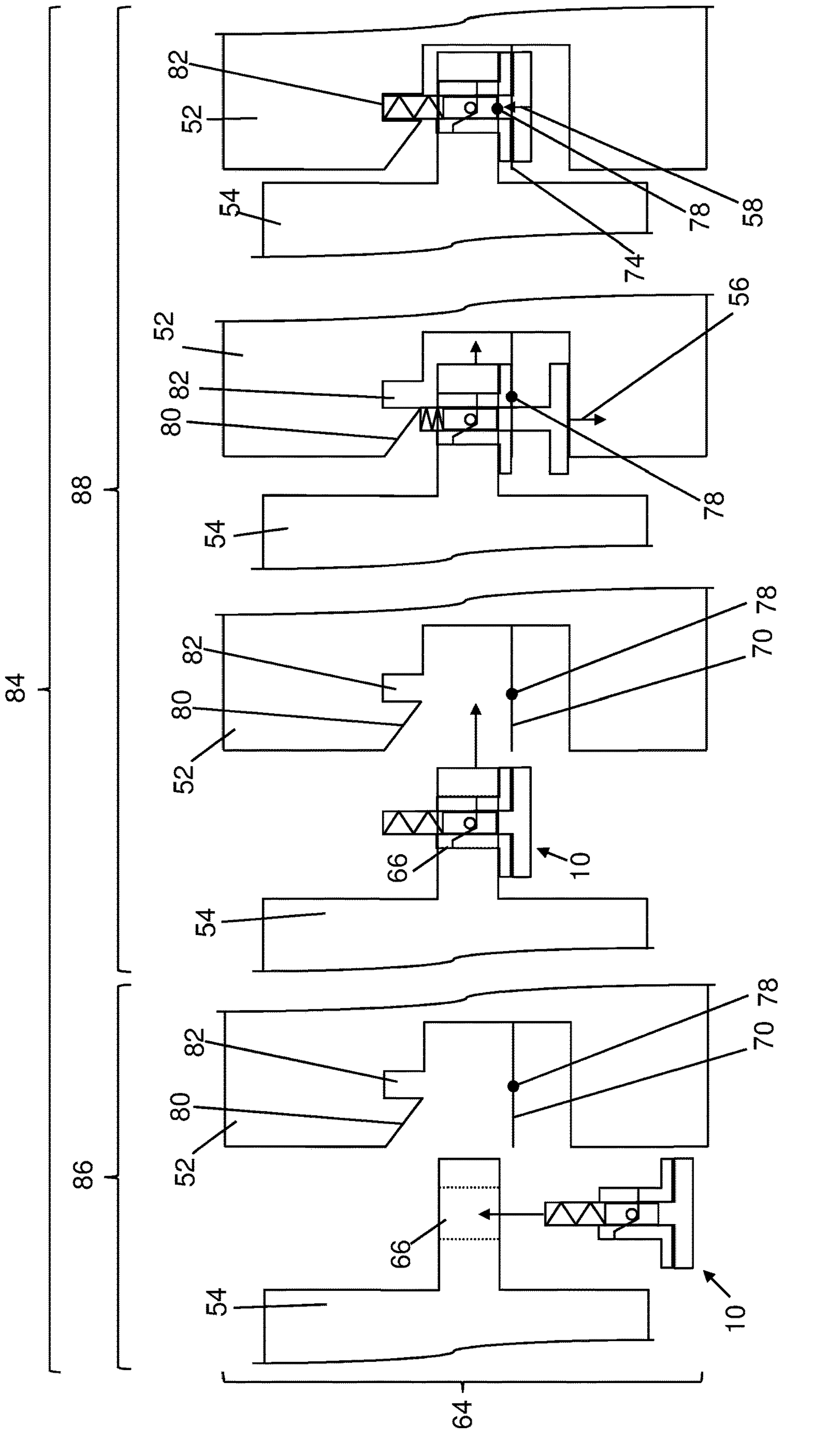
FIGS. 8A-8D show a sequence of steps of a method for assembling a laboratory instrument door assembling kit.

FIGS. 7A-7B show schematic side views of an embodiment of a laboratory instrument door assembling kit (64) comprising a door frame (52), a door hinge (10) as shown in FIG. 6, and a door leaf (54). In the shown embodiment, the door leaf (54) comprises a mounting element (66) in form of a fixation hole into which the hollow body (14) can be inserted and fixed. The door frame (52) comprises a mounting structure (68) configured to mount the linear guiding element (22). In an alternative embodiment, the door frame (52) comprises the mounting element (66) configured to mount the hollow body (14) on the door leaf (54) and the door leaf (54) comprises the mounting structure (68) configured to mount the linear guiding element (22). The shown mounting structure (68) comprises a fixing plate (70) comprising a first side (72), a second side (74), an elongated slot (76), and a fixation position (78). A top view of the fixing plate (70) is shown in FIG. 7B. The elongated slot (76) is configured to insert the linear guiding element (22) to the fixation position (78) as shown in FIGS. 8B and 8C. As further shown in FIG. 8C, the hollow body (14) is slidable on the first side (72) of the fixing plate (70) when the linear guiding element (22) is inserted into the elongated slot (76). The mounting structure (68) further comprises an introduction slope (80) configured to exert a further force on the linear guiding element (22) when the linear guiding element (22) is inserted into the elongated slot (76). The linear guiding element (22) is movable in the third direction (56) when the introduction slope (80) exerts the further force on the linear guiding element (22) as shown in FIG. 8C. The elastic member (31) can build up a tension when the linear guiding element (22) moves in the third direction (56) as shown in FIGS. 6B and 8C. The mounting structure (68) further comprises a fixing recess (82) configured to fix the linear guiding element (22) as shown in FIG. 8D. As further shown in FIG. 8D, the elastic member (31) relaxes its tension when the linear guiding element (22) is in the fixation position (78). The linear guiding element (22) is movable in the fourth direction (58) when the elastic member (31) relaxes its tension.

The linear guiding element (22) is movable into the fixing recess (82) when the linear guiding element (22) moves in the fourth direction (58). The supporting element (48) of the linear guiding element (22) can press against the second side (74) of the fixing plate (70) when the linear guiding element (22) moves in the fourth direction (58).

FIGS. 8A-8D show a sequence of steps (86, 88) of a method (84) for assembling a laboratory instrument door assembling kit (64) as shown in FIG. 7. In step a) (86) of the method (84), the hollow body (14) is mounted on the mounting element (66). For example, the hollow body (14) is inserted into the fixation hole as indicated by an arrow in FIG. 8A. Then, in step b) (88) of the method (84), the linear guiding element (22) is inserted into the elongated slot (76) as indicated by arrows in FIGS. 8B and 8C until the linear guiding (22) is in the fixation position (78) as shown in FIG. 8D. As shown in FIG. 8C, the introduction slope (80) exerts the further force on the linear guiding element (22) when the linear guiding element (22) is inserted into the elongated slot (76). The linear guiding element (22) moves in the third direction (56) when the introduction slope (80) exerts the further force on the linear guiding element (22) and the elastic member (31) builds up a tension. In FIG. 8D, the linear guiding element (22) is in the fixation position (78) and the elastic member (31) relaxes its tension. By relaxing the tension of the elastic member (31), the linear guiding element (22) moves in the fourth direction (58) into the fixing recess (82) and the supporting element (48) of the linear guiding element (22) presses against the second side (74) of the fixing plate (70).

In the preceding description and figures, numerous specific details are set forth in order to provide a thorough understanding of the present disclosure. It will be apparent, however, to one having ordinary skill in the art that the specific detail need not be employed to practice the present teaching. In other instances, well-known materials or methods have not been described in detail in order to avoid obscuring the present disclosure.

Particularly, modifications and variations of the disclosed embodiments are certainly possible in light of the above description. It is therefore to be understood, that within the scope of the appended claims, the invention may be practiced otherwise than as specifically devised in the above examples.

Reference throughout the preceding specification to "one embodiment", "an embodiment", "one example" or "an example", means that a particular feature, structure or characteristic described in connection with the embodiment or example is included in at least one embodiment. Thus, appearances of the phrases "in one embodiment", "in an embodiment", "one example" or "an example", in various places throughout this description are not necessarily all referring to the same embodiment or example.

LIST OF REFERENCE NUMBERS

10—door hinge
14—hollow body
16—first longitudinal axis
17—vector parallel to first longitudinal axis
18—curved side wall
20—track
22—linear guiding element
24—second longitudinal axis
26—body
28—protruding pin
29—further protruding pin
30—force generator
31—elastic member
32—first direction
33—second direction
34—linear through hole
35—further linear through hole
36—first section
37—surface normal of the first section
38—moving section
39—surface normal of moving section
40—second section
41—surface normal of the second section
42—third section
43—inclination angle α
44—first part of the moving section
45—inclination angle β
46—second part the moving section
47—bearings
48—supporting element
49—further supporting element
50—laboratory instrument door
52—door frame
53—screw
54—door leaf
55—platform
56—third direction
58—fourth direction
60—laboratory instrument
62—housing
64—laboratory instrument door assembling kit
66—mounting element
68—mounting structure
70—fixing plate
72—first side
74—second side
76—elongated slot
78—fixation position
80—introduction slope
82—fixing recess
84—method for assembling the laboratory instrument door assembling kit
86—method step a)
88—method step b)

What is claimed is:

1. A door hinge for a laboratory instrument door comprising:

a hollow body with a first longitudinal axis, wherein the hollow body comprises a curved side wall, wherein the curved side wall comprises a track that defines a first section, a second section and a moving section that connects the first section with the second section and is inclined relative to the first longitudinal axis;

a linear guiding element with a second longitudinal axis parallel to the first longitudinal axis, wherein at least a part of the linear guiding element is arranged in the hollow body, wherein the linear guiding element and the hollow body are rotatable against each other; and a body comprising a protruding pin, wherein the body is movably attached to the linear guiding element so that the body is movable in two opposite directions along the second longitudinal axis and the protruding pin is movable on the track wherein the second section is oriented in a right angle relative to the first longitudinal axis so that the protruding pin is stopped and held on the second section, wherein the door hinge further comprises a force generator configured to exert a force on the body for moving the body in a first direction of the two opposite directions, wherein the force generator is an elastic member connecting the linear guiding element with the body, wherein the force generates a tension relaxation within the elastic member.

2. The door hinge for a laboratory instrument door according to claim 1, wherein the protruding pin is a lateral protrusion of the body, wherein the linear guiding element comprises a linear through hole, wherein the linear through hole is parallel to the second longitudinal axis and adapted to guide the protruding pin.

3. The door hinge for a laboratory instrument door according to claim 1, wherein the first section is oriented in a right angle relative to the first longitudinal axis so that the protruding pin is stopped and held on the first section.

4. The door hinge for a laboratory instrument door according to claim 1, wherein the track comprises a third section, wherein the moving section comprises a first part and a second part, wherein the first part of the moving section is connecting the first section with the third section of the track and the second part of the moving section is connecting the third section with the second section of the track, wherein the third section is oriented in a right angle relative to the first longitudinal axis so that the protruding pin is stopped and held on the third section.

5. The door hinge for a laboratory instrument door according to claim 1, wherein the linear guiding element comprises a supporting element adapted to mount the linear guiding element on a door frame or on a door leaf.

6. The door hinge for a laboratory instrument door according to claim 1, wherein the linear guiding element protrudes beyond the hollow body, the linear guiding element is movably attached to the hollow body and movable along the first longitudinal axis in a third direction and in a fourth direction opposite of the third direction when the protruding pin is held on the first section, second section, or third section of the track.

7. A laboratory instrument door assembling kit comprising:

a door frame;

a door hinge according to claim 6; and a door leaf, wherein the door leaf or the door frame comprises a mounting element configured to mount the hollow body, wherein the door frame comprises a mounting structure if the door leaf comprises the mounting element or the door leaf comprises the mounting structure if the door frame comprises the mounting element, wherein the mounting structure is configured to mount the linear guiding element, and wherein the mounting structure comprises:

a fixing plate comprising a first side, a second side, an elongated slot, and a fixation position, wherein the elongated slot is configured to insert the linear guiding element to the fixation position, wherein the hollow body is slidable on the first side of the fixing plate when the linear guiding element is inserted into the elongated slot;

an introduction slope configured to exert a further force on the linear guiding element when the linear guiding element is inserted into the elongated slot, wherein the linear guiding element is movable in the third direction when the introduction slope exerts the further force on the linear guiding element, wherein the elastic member can build up a tension when the linear guiding element moves in the third direction; and a fixing recess configured to fix the linear guiding element, wherein the elastic member can relax its tension when the linear guiding element is in the fixation position, wherein the linear guiding element is movable in the fourth direction when the elastic member relaxes its tension, wherein the linear guiding element is movable into the fixing recess when the linear guiding element moves in the fourth direction, and wherein a supporting element of the linear guiding element can press against the second side of the fixing plate when the linear guiding element moves in the fourth direction.

8. A method for assembling the laboratory instrument door assembling kit according to claim 7, wherein the method comprises the following steps:

mounting the hollow body on the mounting element; and inserting the linear guiding element into the elongated slot of the mounting structure until the linear guiding element is in the fixation position.

9. A laboratory instrument door comprising:

a door frame;

a door hinge according to claim 1, wherein the linear guiding element or the hollow body is mounted on the door frame; and a door leaf, wherein the hollow body is mounted on the door leaf if the linear guiding element is mounted on the door frame and the linear guiding element is mounted on the door leaf if the hollow body is mounted on the door frame.

10. The laboratory instrument door according to claim 9, wherein the door frame is configured to stop the door leaf when the body moves in the first direction so that the protruding pin is stopped on the moving section when the door frame stops the door leaf.

11. A laboratory instrument comprising:

a laboratory instrument door according to claim 9; and a housing, wherein the door frame is mounted on the housing or the door frame is comprised by the housing.

* * * * *